United States Patent [19]

Shiraishi et al.

[11] Patent Number: 5,504,682
[45] Date of Patent: Apr. 2, 1996

[54] METHOD AND APPARATUS FOR DETECTING MISFIRES IN AN INTERNAL COMBUSTION ENGINE

[75] Inventors: Takashi Shiraishi, Oomiya; Mamoru Nemoto; Yuichi Kashimura, both of Katsuta; Toshio Ishii, Mito, all of Japan

[73] Assignees: Hitachi, Ltd., Tokyo; Hitachi Automotive Engineering Co., Ltd., Ibaraki, both of Japan

[21] Appl. No.: 317,542

[22] Filed: Oct. 4, 1994

[30] Foreign Application Priority Data

Oct. 5, 1993 [JP] Japan .................... 5-249179

[51] Int. Cl.$^6$ ............................... G01M 15/00
[52] U.S. Cl. ................ 364/431.08; 364/424.03; 73/117.3
[58] Field of Search .............. 364/424.03, 431.08, 364/431.11; 73/117.2, 117.3; 123/479

[56] References Cited

U.S. PATENT DOCUMENTS

| | | | |
|---|---|---|---|
| 5,012,695 | 5/1991 | Kyohzuka et al. | 74/859 |
| 5,237,504 | 8/1993 | Holmes et al. | 364/431.08 |
| 5,241,480 | 8/1993 | Takaku et al. | 364/431.08 |
| 5,263,365 | 11/1993 | Muller | 73/117.3 |
| 5,263,453 | 11/1993 | Wakahara et al. | 123/436 |
| 5,345,817 | 9/1994 | Grenn et al. | 73/117.3 |
| 5,353,636 | 10/1994 | Sakurai et al. | 73/117.3 |
| 5,379,634 | 1/1995 | Kuroda et al. | 73/116 |

FOREIGN PATENT DOCUMENTS

4-209950  7/1992  Japan .

Primary Examiner—Michael Zanelli
Attorney, Agent, or Firm—Evenson, McKeown, Edwards & Lenahan

[57] ABSTRACT

The invention provides an internal combustion engine misfire detection device for a motor vehicle in which an output of an internal combustion engine is transmitted via a torque converter to a drive shaft. A primary misfire detecting unit detects an internal combustion engine misfire condition including a possible false condition thereof; and an external cause detecting unit detects an influence associated with an external cause variation in terms of an operating condition variation transmitted from the drive shaft via the torque converter. A misfire judging unit judges whether the internal combustion engine misfire condition detected by the primary misfire detecting unit is a true misfire condition or a false misfire condition based on the detection output from the external cause detecting unit. A processing unit performs a predetermined processing to detect a misfire operating condition in response to a judgment by the misfire judging unit that the detected operating condition is a true misfire operating condition; and a misfire judgment disabling unit renders the misfire judging unit inoperative in response to a judgment by the misfire judging unit that the detected operating condition is a false misfire operating condition.

7 Claims, 10 Drawing Sheets

METHOD AND APPARATUS FOR DETECTING MISFIRES IN AN INTERNAL COMBUSTION ENGINE

BACKGROUND OF THE INVENTION

1. Field of the Invention

The present invention relates to a method and apparatus for evaluating the operating condition of a motor vehicle in which an output of an internal combustion engine is transmitted to a driving shaft via a torque converter of a change gear and a detection method thereof, and, more specifically, relates to an internal combustion engine misfire detecting device in such a motor vehicle in which an output of an internal combustion engine is transmitted to a driving shaft via a torque converter of a change gear. More the present invention specifically, relates to an internal combustion engine misfire detecting device in such a motor vehicle.

2. Description of Related Art

A conventional motor vehicle operating condition detecting method, for example an engine misfire detecting method, is disclosed in JP-A-4-209950(1992) in which through precise detection of engine rpm variation a misfire of a particular cylinder among a plurality of cylinders is detected based on an rpm increase after an ignition. In order to eliminate false readings based on rpm variation due to external causes such as bad roads other than engine misfire, such as information relating to respective wheel speeds and means for stopping misfire judgement based on signals from an accelerometer mounted on the vehicle body, are used.

However, it is necessary to mount rpm detection sensors at respective wheels for obtaining the wheel speed information and further it was difficult to correlate a wheel speed variation level with the engine rpm variation. Further, in the method wherein the misfire judgement is stopped when detecting vibrations with the accelerometer generated on the vehicle body due to bad roads, it is necessary to mount the accelerometer, and it was likely difficult to correlate an engine rpm variation starting point with an acceleration which required a substantial time for determining the control data therefor. Further, in case of a change gear using a torque converter there was a problem that it was difficult to accurately determine the time until a wheel load variation, such as a bad road, affects an engine load variation and the variation amount thereof.

SUMMARY OF THE INVENTION

An object of the present invention is to provide a method and device for detecting an operating condition of a motor vehicle in which an output of an internal combustion engine is transmitted to a driving shaft via a torque converter of a change gear, which accurately detects variations of the motor vehicle operating conditions without necessitating any special sensors.

For achieving the above object, the motor vehicle operating condition detecting device according to the present invention is provided with a primary operating condition detecting unit (which initially detects the motor vehicle operating conditions, possibly including a false or erroneous indication of an operating condition), an external cause detecting unit (which detects externally caused variation of an operating condition variation transmitted from the drive shaft via the torque converter) and a true operating condition judging unit which judges whether the detection result from the primary operating condition detecting unit is a true operating condition, based on the detection output from the external cause detecting unit.

Another object of the present invention is to provide a method and apparatus for internal combustion engine misfire detection in a motor vehicle type described previously which accurately detects a misfire operating condition without necessitating any special sensors.

For achieving the above object, the internal combustion engine misfire detection method according to the present invention comprises the steps of determining an rpm ratio based on an engine rpm and a torque converter rpm, calculating a turbine torque based on the determined rpm ratio, judging an engine rpm variation based on variation of the calculated torque, temporarily disabling or inhibiting a misfire judgement based on the variation judgement result in certain circumstances.

In the present invention, a speed ratio is determined based on the engine rpm and the torque converter rpm and a turbine torque is calculated based on the determined speed ratio according to a torque converter characteristic. Based on a variation between the determined turbine torque and a normal turbine torque it is judged whether an engine rpm variation is generated, and based on the judgement, misfire detection judgement is interrupted. Namely, a change gear input shaft torque is calculated by making use of a torque converter characteristic of the change gear, and an engine load variation is indirectly estimated. Misfire judgement is then interrupted (or not) based on the load variation information. Accordingly, variation of motor vehicle operating conditions, for example generation of engine rpm variation, is exactly predicted. The motor vehicle operating condition can be controlled without necessitating any special sensors. Other objects, advantages and novel features of the present invention will become apparent from the following detailed description of the invention when considered in conjunction with the accompanying drawings

DETAILED DESCRIPTION OF THE EMBODIMENTS

Hereinbelow, embodiments according to the present invention are explained with reference to the drawings in which same numerals are assigned to same and equivalent elements or members so as to omit duplicate explanation.

Figure 1:
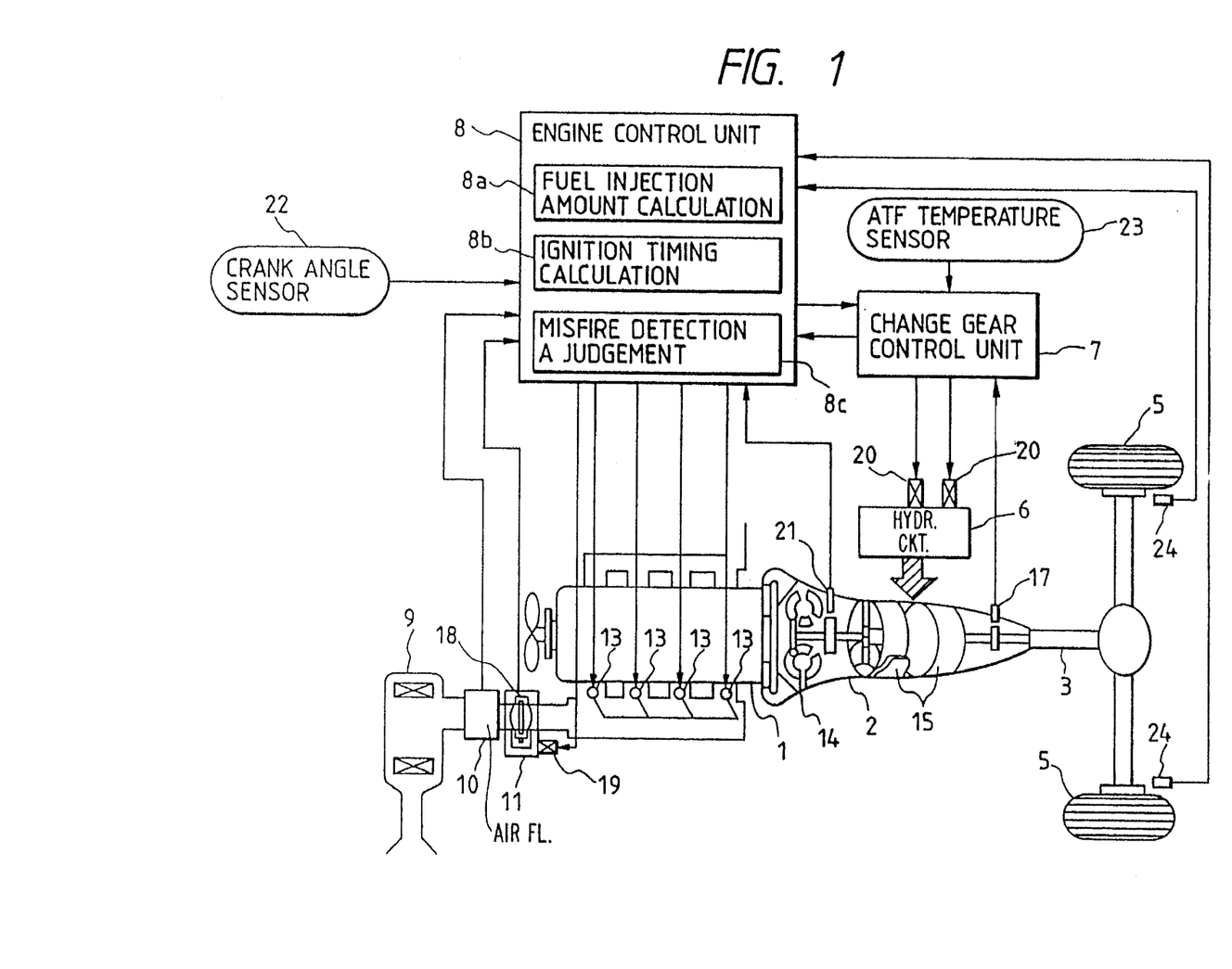
FIG. 1 is a system diagram illustrating one embodiment according to the present invention.

FIG. 1 is a schematic illustration of an embodiment of a misfire detection device according to the present invention. As illustrated in FIG. 1, the misfire detection device according to the present embodiment is provided as one function for an engine control unit 8. To the engine control unit 8 input and output signals are connected from, for example, an air flow sensor 10 which measures intake air flow rate from an air cleaner 9 for an engine 1, a throttle sensor 18 which measures the throttle opening of a throttle control unit 11, an injector 13 which feeds fuel, and an idle speed control valve 19 which controls the engine rpm during idling, a crank angle sensor 22 which measures the engine rotation, a turbine sensor 21 which detects an output shaft rpm of a torque converter 14 provided in a change gear 2 and wheel speed sensors 24 which measure rpm of respective drive wheels 5. A change gear control unit 7 calculates a timing of gear change based on information from a transmission output shaft rpm detection sensor 17 which detects rpm of a drive shaft 3 and information from the throttle sensor 18 provided via the engine control unit 8 switches a change gear hydraulic circuit through actuation of a hydraulic control and switching solenoid valve 20 and changes the gear provided in a gear train 15 by means of the hydraulic circuit 6. Further, the change gear control unit 7 transmits a gear change flag to the engine control unit 8 as an indication that a gear change is in process, and the engine control unit 8 changes the engine torque based on the gear change flag and in response to the engine condition.

The engine control unit 8 is composed of a fuel injection amount calculation unit 8a, an ignition timing calculation unit 8b, and a misfire detection and judgement unit 8c. The fuel injection amount calculation unit 8a calculates a fuel injection amount based on the information from the air flow sensor 10, the throttle sensor 18 and the crank angle sensor 22. The ignition timing calculation unit 8b calculates an ignition timing based on the information from the air flow sensor 10, the throttle sensor 18 and the crank angle sensor 22. The misfire detection and judgement unit 8c performs a misfire detection and a misfire judgement based on the respective signals from the air flow sensor 10, the throttle sensor 18, the turbine sensor 21, the crank angle sensor 22 and the wheel speed sensors 24.

Figure 2:
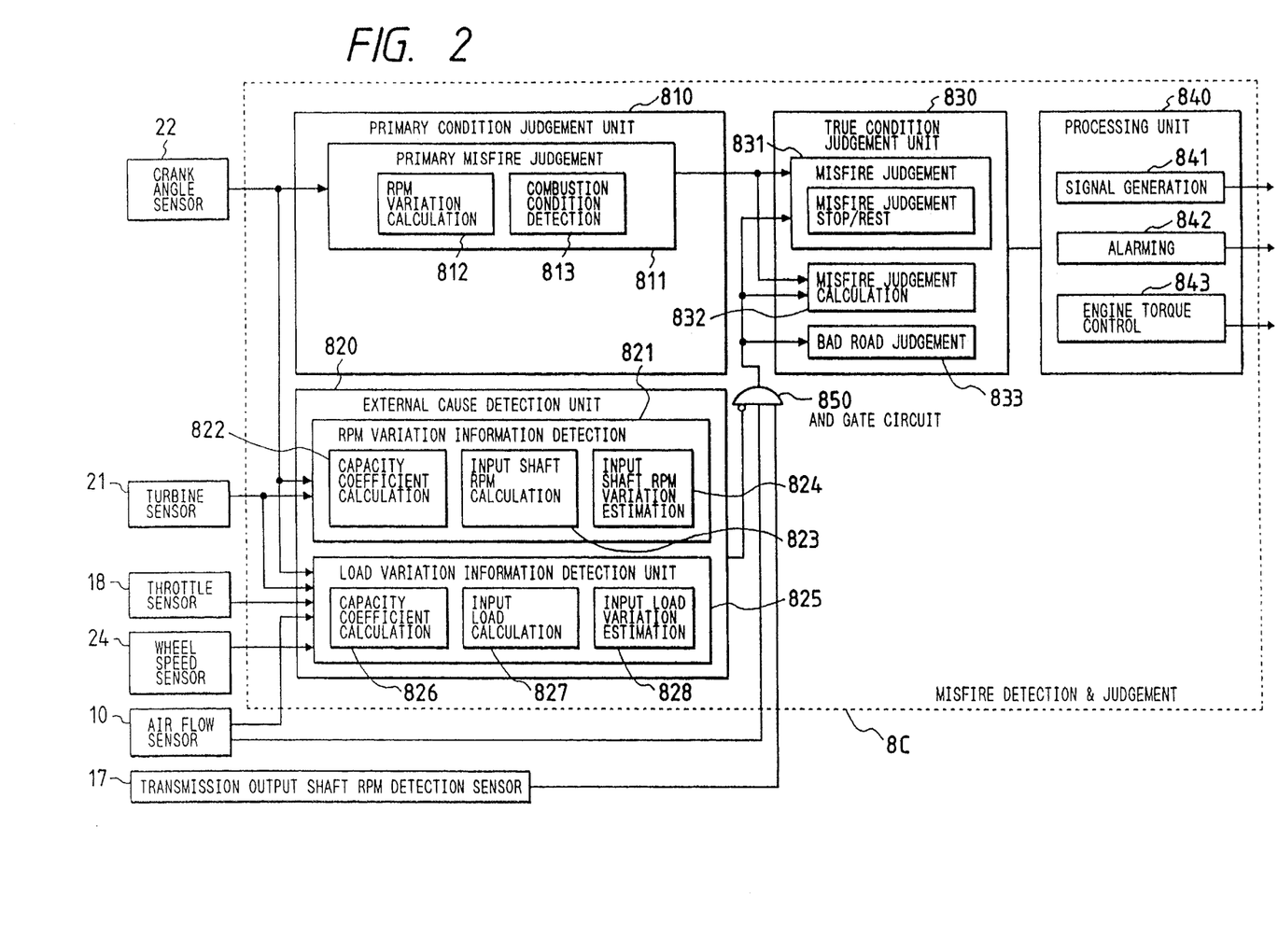
FIG. 2 is a detailed control block diagram of a misfire detection and judgement unit in the engine control unit as shown in FIG. 1.

FIG. 2 shows a functional block diagram of the misfire detection and judgement unit 8c in the engine control unit 8 as shown in FIG. 1. The misfire detection and judgement unit 8c is composed by a primary operating condition detecting unit 810 which receives an output signal from the crank angle sensor 22 and detects operating conditions of a motor vehicle (including a possible false operating condition determinations), an external cause detecting unit 820 which receives output signals from the crank angle sensor 22, the turbine sensor 21, the throttle sensor 18, the wheel speed sensors 24 and the air flow sensor 10 and detects existence and non-existence of an externally caused variation transmitted from the drive wheels 5 of the motor vehicle, a true operating condition judging unit 830 which judges whether the detection result of the primary operating condition detecting unit 810 is a true operating condition or operating condition determination, depending on the detection output from the external cause detection unit 820, and a processing unit 840 which performs a predetermined control processing for the motor vehicle when the detection result from the primary operating condition detecting unit 810 is judged by the true operating condition judging unit 830 as a true operating condition.

The primary operating condition detecting means 810 comprises a primary misfire detecting unit 811 which detects an internal combustion engine misfire condition as well as a possible false operating condition and which is composed by an rpm variation calculating unit 812 which calculates an engine rpm variation based on the output signal from the crank angle sensor 22, and a combustion condition detecting unit 813 which detects the engine combustion condition based on the calculation result.

The external cause detecting unit 820 comprises an rpm variation information detecting unit 821 and a load variation information detecting unit 825. The rpm variation information detecting means 821 is composed by a capacity coefficient calculating means 822 which calculates a capacity coefficient in the torque converter characteristic, an input shaft rpm calculating unit 823 which calculates a change gear input shaft rpm and an input shaft rpm variation estimating unit 824 which estimates an input shaft rpm variation, and detects existence and non-existence of rpm variation information from the side of the drive wheels 5 of the motor vehicle. The load variation information detecting unit 825 is composed by a capacity coefficient calculating unit 826 (which calculates a capacity coefficient in the torque converter characteristic based on the output signals from the crank angle sensor 22, the turbine sensor 21, the throttle sensor 18, the wheel speed sensors 24 and the air flow sensor 10), an input load calculating unit 827 (which calculates an input load from the change gear input shaft) and an input load variation estimating unit 828 (which estimates an input load variation, and detects existence and non-existence of a load variation information from the side of the drive wheels 5 of the motor vehicle).

The true operating condition judging unit 830 comprises a misfire judging unit 831, a misfire judgement calculating means 832 and a bad road judging unit 833. The misfire judging unit 831 including a misfire judgement interrupting unit and the misfire judgement calculating unit 832 judge whether or not the detection result from the primary misfire judging and detecting unit 811 is a misfire, based on the detection information from the rpm variation information detecting unit 821 and the load variation information detecting unit 825. The bad road judging means 833 judges whether or not the variation due to external cause is affected by a bad road based on the detection information from the rpm variation information detecting unit 821 and the load variation information detecting unit 825.

The processing unit 840 comprises a signal generating unit 841, an alarming unit 842 and an engine torque controlling unit 843. When the misfire judging unit 831 and the misfire judgement calculating means 832 judge an occurrence of misfire, the signal generating unit 841 generates a signal for controlling the misfire. Further, the signal generating unit 841 generates a suspension control signal in response to a bad road judgement from the bad road judging unit 833 to suppress an up and down movement of the motor vehicle. The engine torque control unit 843 reduces the engine torque in response to a bad road judgement from the bad road judging unit 833. Through the suppression of up and down movement of the motor vehicle and the reduction of the engine torque a stable and smooth travelling along a bad road is realized. The alarming unit 842 generates an alarm indicating a misfire in response to a misfire judgement from the misfire judging unit 831 and the misfire judgement calculating unit 832.

An AND gate circuit 850 outputs a signal representing that the primary operating condition is true (hereinafter simply called as true representing signal) to the true operating condition judging unit 830 under the condition that the output from the air flow sensor 10 is within a predetermined range, the output from the transmission output shaft rpm detecting sensor 17 is within a predetermined range and the output from the external cause detecting unit 820 represents non-existence of an external cause. When the AND gate circuit 850 outputs a true representing signal, the true operating condition judging unit 830 allows a misfire judgement and otherwise prohibits a misfire judgement.

Figure 3A:
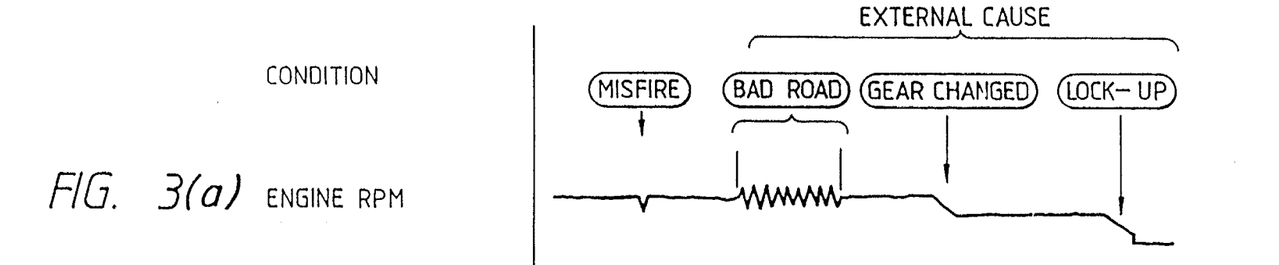
FIGS. 3a–3d are waveform diagrams for explaining an operation of the misfire detection and judgement unit as shown in FIG. 2.
Figures 3B, 3C:
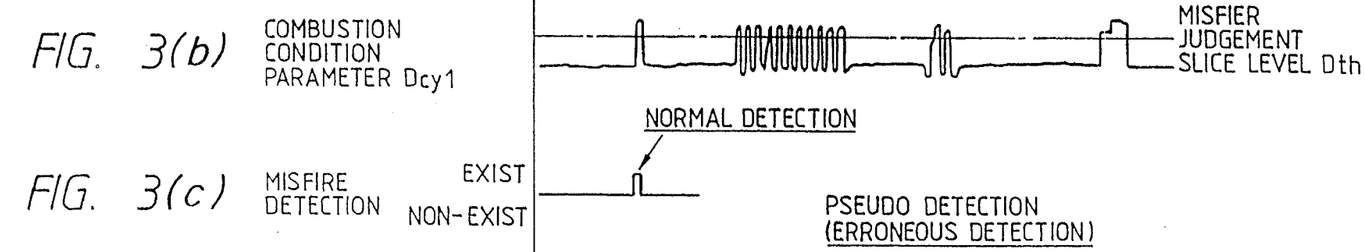
Figure 3D:
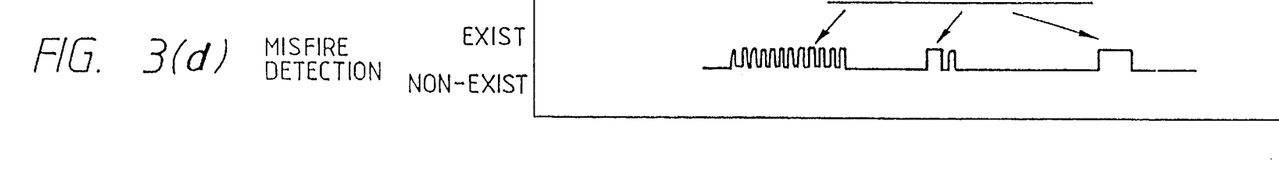

FIGS. 3a–3d show a specific operation of the primary misfire detecting unit 811, which is designed to detect a misfire operating condition of an internal combustion engine and a possible false operating condition, contained in the misfire detection and judgement unit 8c as shown in FIG. 2. FIG. 3a represents several inputs to the rpm variation calculating unit 812 in the primary misfire detecting unit 811 and illustrates engine rpm variations due to a misfire and external causes such as bad road, gear change and lock-up. It is natural that the engine rpm drops when a misfire occurs and, further when the external cause varies due to such as bad road, gear change and lock-up the engine rpm momentarily drops. FIG. 3b–d are diagrams for explaining operation in the combustion condition detecting unit 813. FIG. 3b illustrates a combustion condition parameter D(cyl) during engine rpm variation wherein it is designed that when the engine rpm drops the combustion condition parameter increases and may exceed a misfire judgement slice level Dth depending on magnitude of the engine rpm drop. When the combustion condition parameter D(cyl) exceeds the misfire judgement slice level Dth, the combustion condition detecting unit 813 determines an exsistence of misfire based on the pseudo variations due to external causes such as bad road, gear change and lock-up as shown in FIG. 3d in the same manner as based on the true variation due a misfire as shown in FIG. 3c.

Figure 4:
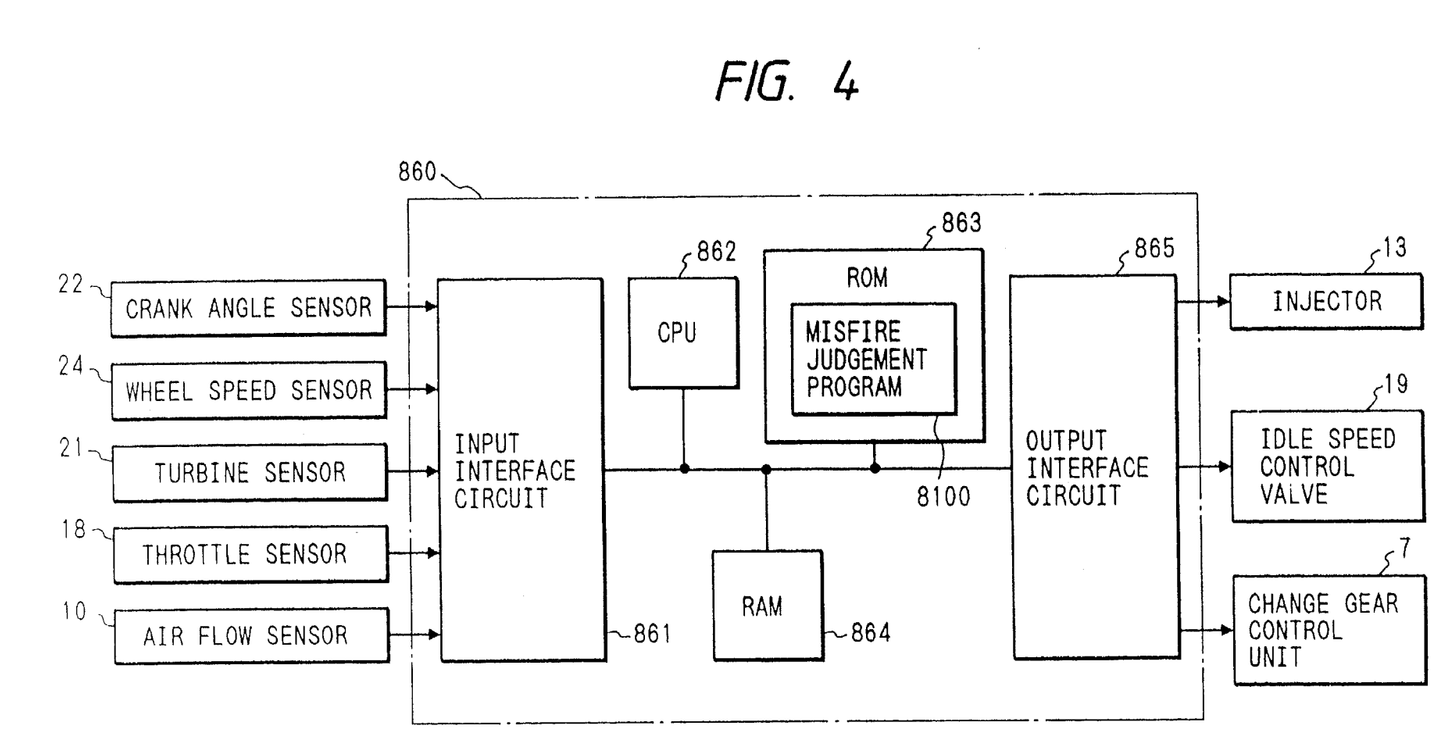
FIG. 4 is a hardware constitution diagram for realizing the misfire detection and judgement unit as shown in FIG. 2.

FIG. 4 is a hardware constitutional diagram of the misfire detection and judgement unit 8c as shown in FIG. 2. A hardware 860 for realizing the misfire detection and judgement unit 8c is constituted by an input interface circuit 861, a CPU 862 which executes many kinds of processings, a ROM 863 and a RAM 864 which store many kinds of data and programs and an output interface circuit 865. A misfire judgement program 8100, which executes processing commands such as misfire detection and misfire judgement, and data are stored in the ROM 863. The CPU 862 executes processings according to the processing programs in the ROM 863 by making use of the data from the input interface circuit 861 and the ROM 863 while time to time inputting and outputting intermediate processing data in and from the RAM 864. The result is outputted via the output interface circuit 865 to the injector 13, the idle speed control valve 19 and the change gear control unit 7 so that the functions for the misfire detection and of misfire confirmation are achieved. As an alternative, the change gear control unit 7 can be incorporated into the hardware 860.

Figure 5:
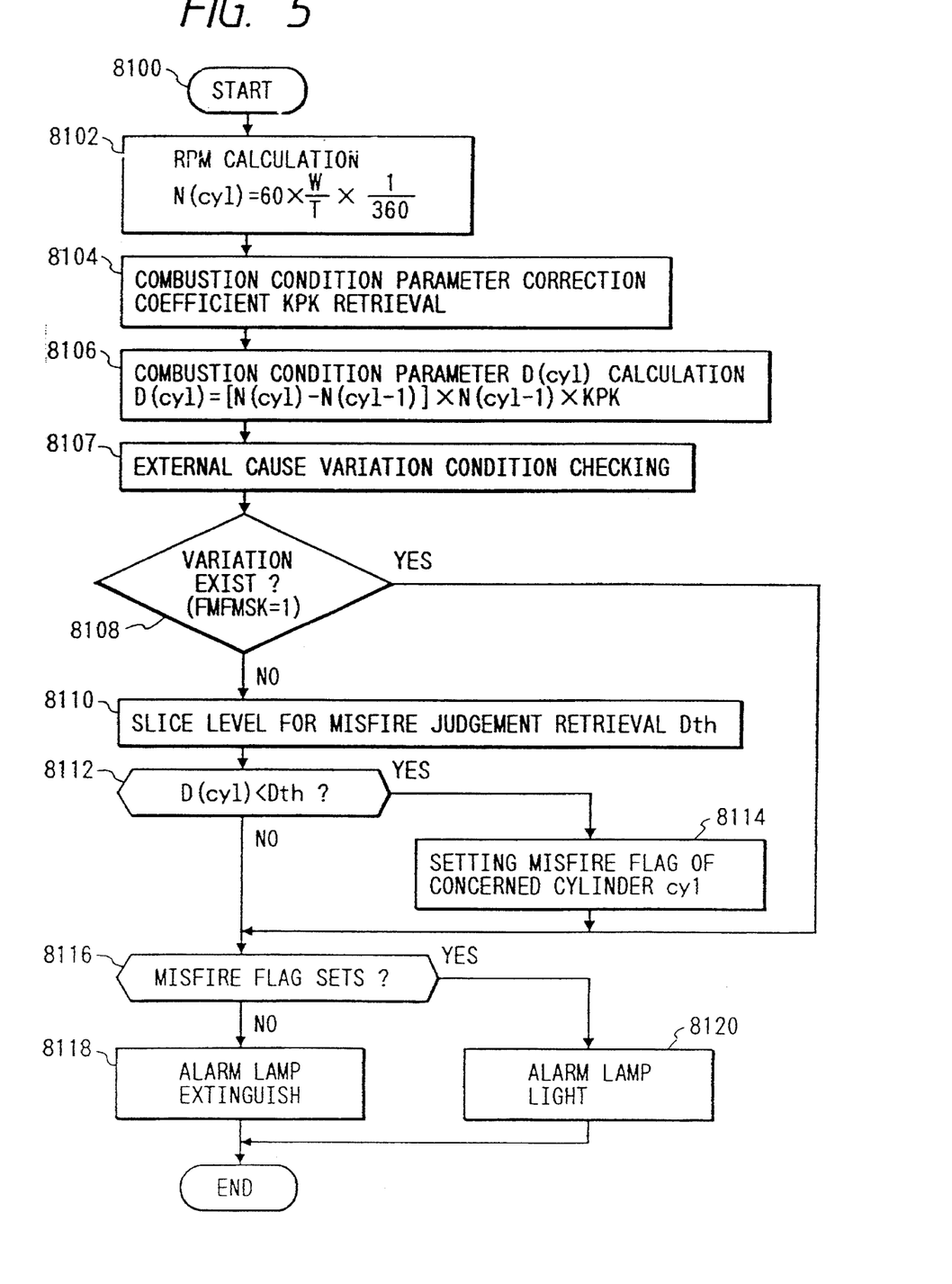
FIG. 5 is a flowchart performed by the misfire judgement program in the hardware constitution diagram as shown in FIG. 4.

Now, the operation of a misfire detection device which is one embodiment according to the present invention is explained with reference to FIGS. 3a–3d through FIG. 9. FIG. 5 shows a flowchart performed according to the misfire confirmation program 8100 as shown in FIG. 4, of which program is performed at every predetermined time.

At first in step 8102 an engine rpm is calculated. In step 8104 a correction coefficient KPK for the combustion condition parameter is retrieved, then in step 8106 a combustion condition parameter D(cyl) is calculated based on the previously calculated engine rpm N(cyl-1), the rpm difference between previous and present ones and the retrieved combustion condition parameter correction coefficient KPK. Subsequently in step 8107 the variation due to external cause is checked which will be explained later in detail. Namely, as illustrated in in FIG. 3a it is judged whether the variation is caused by a real misfire or an external cause such as bad road, gear change and lock-up. Subsequently, when it is judged in step 8108 that there exists a variation due to an external cause, whether a misfire flag is set is calculated in step 8116. When it is judged that there is no variation due to external causes in step 8108, a misfire judgement slice level Dth as illustrated in FIG. 3b is retrieved. Then, it is calculated in step 8112 whether the combustion condition parameter D(cyl) is less than the misfire judgement slice level Dth. When the combustion condition parameter is determined less than the misfire judgement slice level Dth, it is judged that the current condition permits a misfire judgement and a misfire flag for the cylinder concerned is set in step 8114 and then the process proceeds. When it is judged in step 8112 that the combustion condition parameter D(cyl) exceeds the misfire judgement slice level Dth, it is calculated in step 8116 whether a misfire flag is set.

In case when a misfire flag is set the misfire detection is determined as a normal detection as illustrated in FIG. 3c and an alarm lamp indicating a misfire is lighted in step 8120. When no misfire flag is set, the misfire detection is determined as an erroneous detection as illustrated in FIG. 3d and the alarm lamp is extinguished in step 8118.

Figure 6:
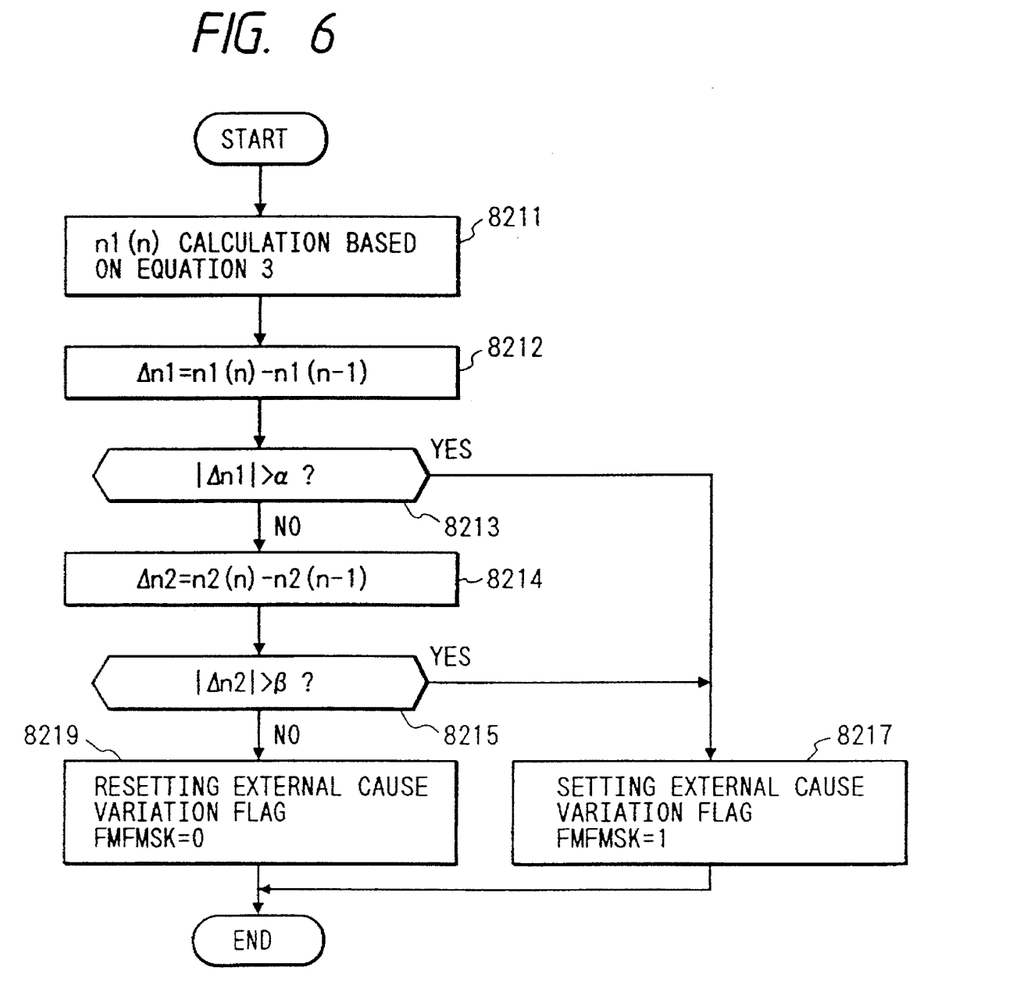
FIG. 6 is a flowchart illustrating a detailed processing of the external cause variation condition in the flowchart as shown in FIG. 5.
Figure 9:
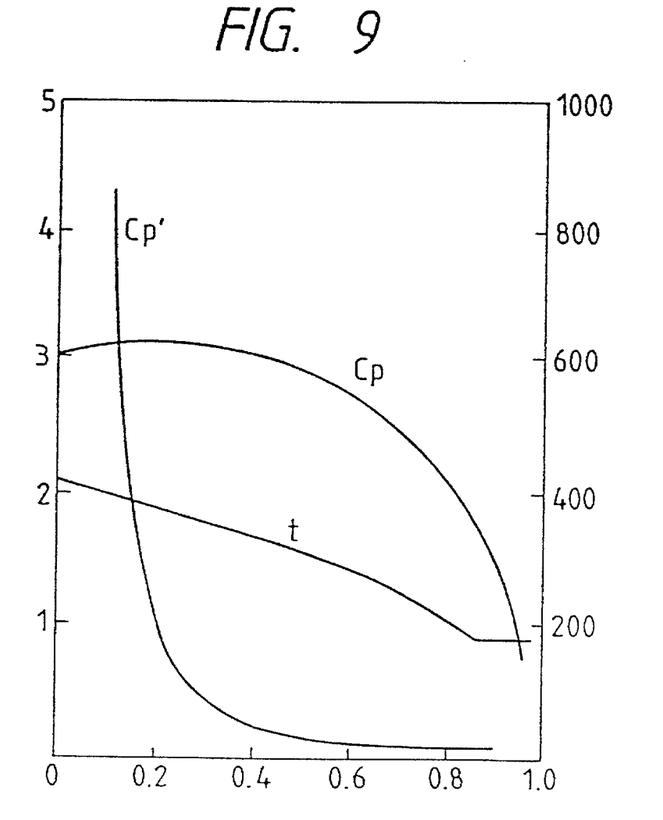
FIG. 9 is a characteristic diagram of the torque converter contained in the system as shown in FIG. 1.

FIG. 6 shows a detailed flowchart in step 8107 checking the external cause varying condition in the flowchart as shown in FIG. 5 of which checking process is executed at every predetermined time. At first in step 8211 an engine rpm n1(n) is calculated. Since the engine rpm varies due to external causes other than a misfire as illustrated in FIG. 3a, an engine rpm variation due to external causes is estimated by making use of the torque converter characteristic as illustrated in FIG. 9 which is stored in the ROM 863 as shown in FIG. 4. As well known, since the torque converter has an action to amplify the torque through slip generation between the pump and the turbine, a torque generated at the change gear input shaft can be backwardly calculated based on an input and output rpm ratio and a torque amplification rate. The torque converter characteristic is generally defined by input and output rpm ratio $e=n2/n1$ in abscissa and input and output torque ratio $t=T2/T1$ and capacity coefficient $Cp=T1/n1^2$ in ordinate. Wherein, n1 represents input shaft rpm (engine rpm), n2 : output shaft rpm (turbine rpm), T1 : input torque (engine torque), T2 : output torque (turbine torque). The input capacity coefficient Cp represents characteristic of the torque converter which is determined by the size and structure thereof. The rpm ratio e is determined by the engine rpm and the turbine rpm and based on the rpm ratio e the torque ratio t and the input shaft capacity coefficient Cp are determined. Accordingly, when assuming the current input shaft capacity coefficient and engine rpm as Cp and n1 respectively, the current engine torque T1 is determined according to the following equation (1):

$$T1 = Cp/n1^2 \qquad (1)$$

Further, when assuming the current turbine torque and turbine rpm as T2 and n2 respectively, an inverted input capacity coefficient Cp' is expressed the following equation (2):

$$Cp' = T2 \times n2^2 = tCp/e^2 \qquad (2)$$

The current engine rpm n1 can be expressed by the following equation (3) using the above two equations:

$$n1 = n2(t \times Cp/Cp')^{-1/2} \qquad (3)$$

Although in the above embodiment, influences such as by a torque converter oil temperature are not taken into consideration, it is preferable to make use of a signal from an automatic transmission fluid temperature sensor 23 in an actual control in order to compensate the torque converter characteristic variation due to oil tempreture variation.

Now, back to the flowchart as shown in FIG. 6. In step 8212 a difference Δn1 between the current engine rpm n1 and the previous engine rpm n1(n-1) is calculated. Then, in step 8213 it is calculated whether the absolute value of the difference Δn1 is larger than a predetermined value α and if so, it is judged that such engine rpm variation is generated because the motor vehicle comes across a bad road or a slippery road, and an external cause variation flag is immediately set at FMFMSK=1 in step 8217, and then a processing for stopping or resting the misfire judgment is inhibited. When it is judged that the absolute value |Δn1| is less than the predetermined value α in step 8213, a difference Δn2 between the current turbine rpm and the previous turbine rpm is calculated in step 8214. When it is determined in step 8215 that the absolute difference |Δn2| is larger than a predetermined value β, it is judged that the turbine rpm is reduced by some causes and it is estimated that such will soon cause an engine rpm variation, thus in step 8217 the external cause variation flag is set at FMFMSK=1 and the misfire judgement is inhibited. When it is determined in step 8215 that the absolute value |Δn2| is less than the predetermined value β, it is judged that the current condition permits a misfire judgement so that the external cause variation flag is set at FMFMSK=0 in step 8219 so as to permit a misfire judgement.

Figure 7:
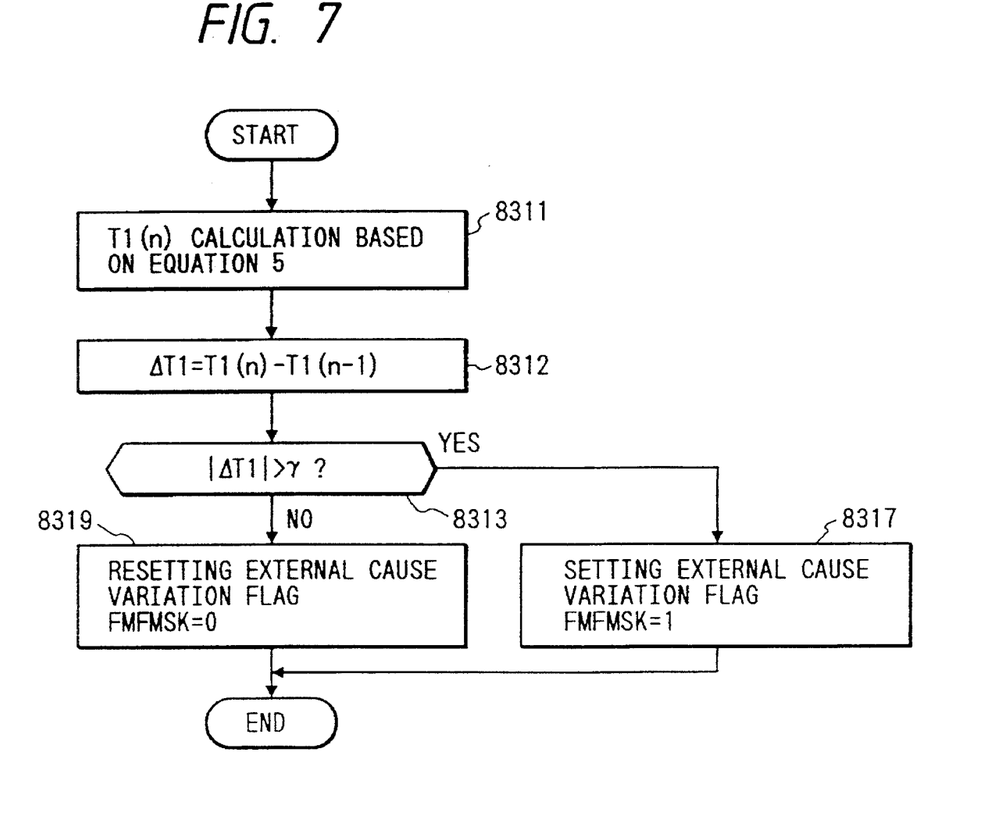
FIG. 7 is a flowchart illustrating another detailed processing of the external cause variation condition in the flowchart as shown in FIG. 5.

With the processing as illustrated in FIG. 7 in place of one illustrated in FIG. 6 the external cause varying condition can also be determined by making use of an engine torque.

For obtaining an equation determining the engine torque, the following equation (4) is formulated by making use of the equation (2) and the equation with regard to the torque ratio t=T2/T1:

$$Cp' = t \times T1 \times n2^2 \qquad (4)$$

Through rearranging the above equation with regard to the engine torque T1, the following equation (5) is obtained:

$$T1 = Cp'/t \times n2^2 \qquad (5)$$

By making use of the above equation and following the flowchart as shown in FIG. 7, the external cause variation is judged in the following manner.

At first, in step 8311 an engine torque T1(n) is calculated according to the equation (5), wherein the data is calculated at every 10 ms. In step 8312 a difference ΔT1 between the presently calculated engine torque T1(n) and the previously calculated engine torque T1 (n-1) is calculated. Then it is calculated in step 8313 whether the absolute value |ΔT1| is larger than a predetermined value γ, and if so, occurrence of such external causes is estimated as the motor vehicle comes across a bad road or a slippery road or touches steps such as a curb and a cateye separating lanes. The external cause variation flag is then set at FMFMSK=1 in step 8317, and the processing for stopping or resting the misfire judgement is inhibited. When the absolute value |ΔT1| is below the predetermined value γ, the external cause variation flag is set at FMFMSK=0 in step 8319 so as to permit the misfire jadgement. When the process as illustarated in FIG. 5 is performed with reference to the condition of the external cause variation flag determined according to the flowchart in FIG. 7, the influences of the external causes are eliminated and an accurate misfire judgement is realized.

Figures 8A, 8B:
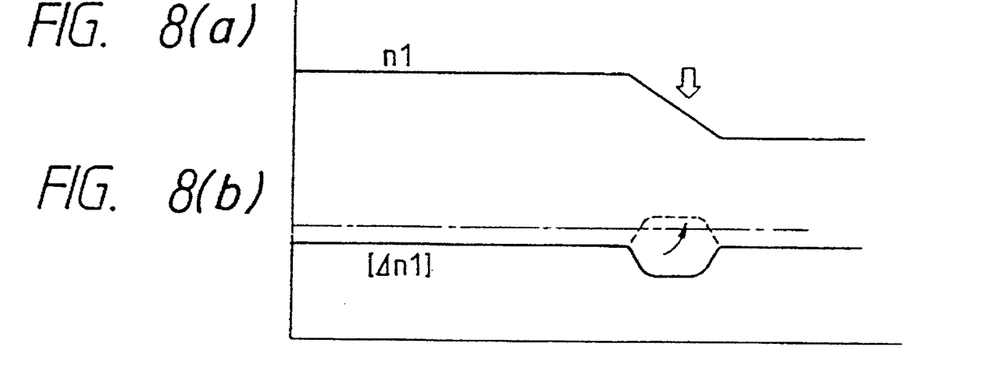
FIGS. 8a and 8b are views for explaining gear change and lock-up operations in connection with the calculation processings of n1(n) and Δn1 in the flowchart as shown in FIG. 6.

The flowchart illustrated in FIG. 6 in particular with regard to calculations using the respective equations in steps 8211 and 8212 has been explained with reference to the example when the motor vehicle comes across a bad road. However, the processing as illustrated in FIG. 6 is similarly applicable to the variation due to gear change and lock-up. Namely, during a gear change and a lock-up when the gear in the change gear 2 changes while the rpm at the drive shaft 3 is unchange, the turbine rpm n2 suddenly drops and t×Cp increases according to the equation (3), therefore the engine rpm n1 decreases as illustrated in (a) in FIG. 8. Contrary to the shift-up operation, during a shift-down operation the turbine rpm suddenly rises and t×Cp decreases, thus the engine rpm n1 increases. FIG. 8b illustrates the absolute difference |Δn1| of the rpm variation in FIG. 8a, as will be understood from the drawing the rpm variation can be similarly detected when the predetermined value α is properly set. Accordingly, the variations of n1 and n2 during the gear change and lock-up operations can be detected in the same manner as when the motor vehicle comes across a bad road so that the processing based on the flowchart illustrated in FIG. 6 is also applicable to the gear change and lock-up oparations.

Figure 10:
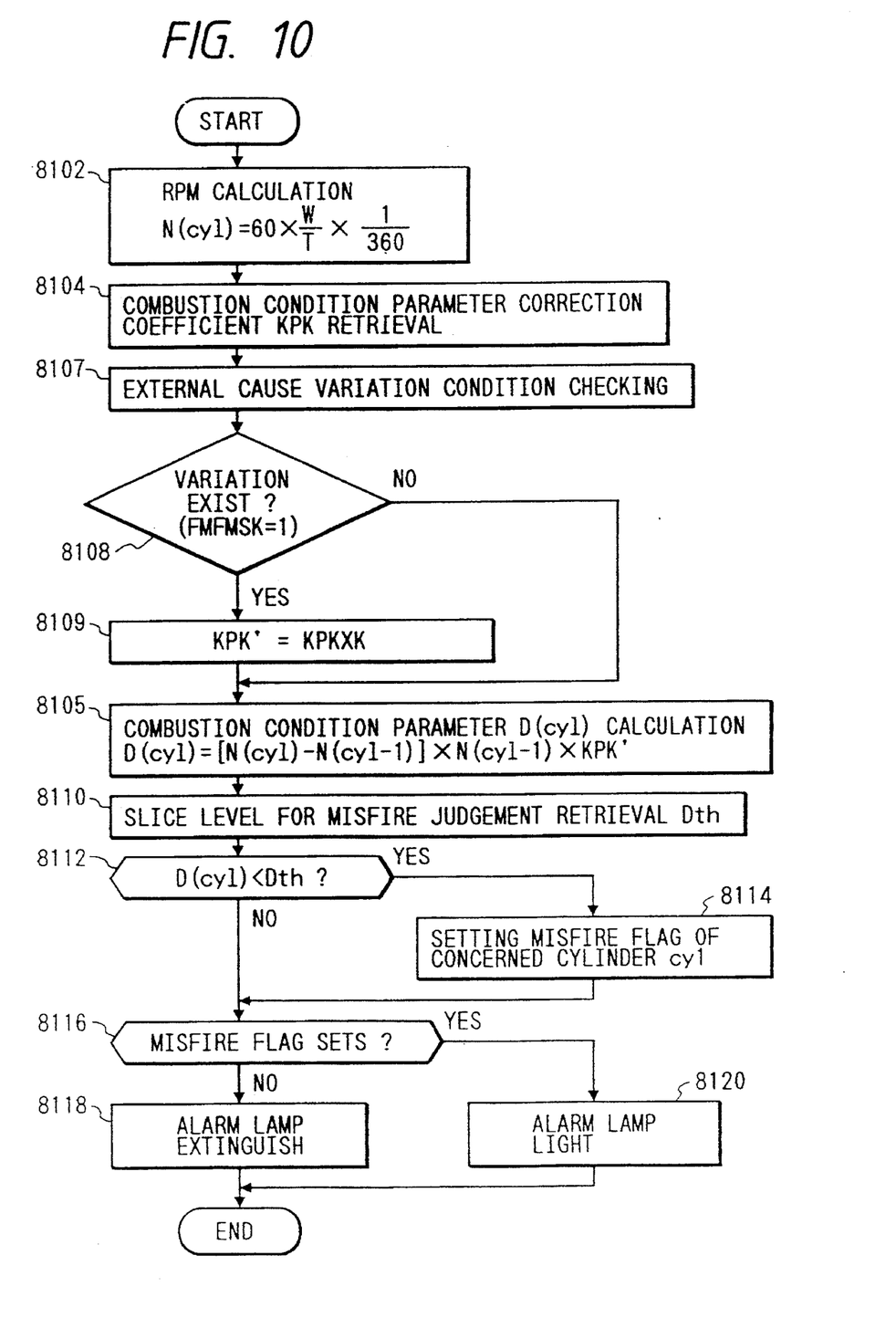
FIG. 10 is a flowchart performed by a misfire judgement program in another embodiment according to the present invention.

FIG. 10 shows a flowchart performed according to a misfire judgement program 8100 in another embodiment according to the present invention, of which program is executed at every predetermined time, and the hardware constitution of the present embodiment is same as that illustrated in FIG. 4.

Figure 11A:
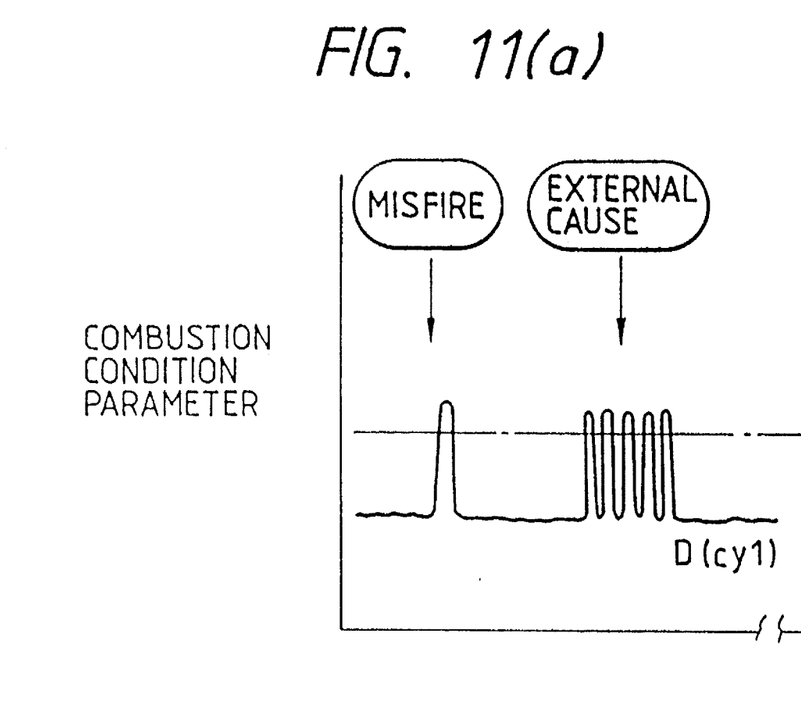
FIGS. 11a and 11b are views for explaining a gain reduction of combustion condition parameter level during travelling along a bad road in the flowchart as shown in FIG. 10.
Figure 11B:
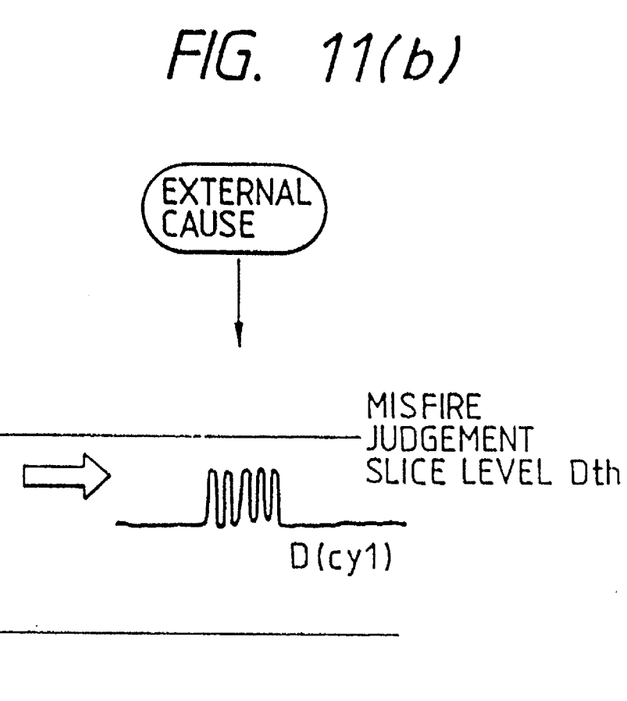

In step 8102 an engine rpm N(cyl) is calculated. Then in step 8104 a correction coefficient KPK of a combustion condition parameter is retrieved and a variation condition due to external causes is checked in step 8107. When it is judged in step 8108 that there is no variation due to external causes, the process proceeds to step 8105. When it is judged in step 8108 that there is a variation due to external causes, a modified correction coefficient KPK' is determined in step 8109 in which the retrieved correction coefficient KPK is multiplied by a coefficient K which reduces the gain so as to lower the level of the combustion condition parameter D(cyl) affected by external causes as shown in FIG. 11a below the misfire judgement slice level Dth as shown in FIG. 11b and to prevent an erroneous misfire judgement. Subsequently, a combustion condition parameter D(cyl) is calculated in step 8105 based on the previously calculated engine rpm N(cyl-1), an rpm difference between previous and present ones and the modified correction coefficient KPK'. Then in step 8110 a misfire judgement use slice level Dth is retrieved and it is calculated in step 8112 whether the combustion condition parameter D(cyl) is less than the misfire judgement use slice level Dth. When the combustion condition parameter D(cyl) is below the misfire judgement slice level Dth, it is judged that the condition permits a misfire judgement, and a misfire flag for the cylinder concerned is set in step 8114 and then the process proceeds to step 8116. When it is judged in step 8112 that the combustion condition parameter D(cyl) is above the misfire judgement slice level Dth, it is calculated in step 8116 whether the misfire flag is set, and when the misfire flag is set, the misfire alarm lamp is lighted in step 8120 and when the misfire flag is not set, the misfire alarm lamp is extinguished in step 8118.

According to the present invention a variation in operating condition, for example variation generation in an engine rpm, of a motor vehicle provided with a change gear with a torque converter due to external causes such as a bad road and a slippery road is accurately determined, thereby a diagnosable range of a motor vehicle operating condition is expanded. Further, with the present invention an accurate diagnosis of motor vehicle operating condition can be realized in an unexpesive manner without necessitating any special sensors. Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A combustion condition detection system for respective cylinders in an internal combustion engine, comprising:

an engine control unit which receives input signals form a crank angle sensor, an air flow sensor and a throttle sensor and outputs fuel injection signals to fuel injectors for the respective engine cylinders;

a change gear control unit which performs inputting and outputting control signals with said engine control unit and outputs signals for changing gears in a gear train coupled to a torque converter in a change gear via a hydraulic circuit in the change gear; and a turbine sensor provided in said torque converter, wherein said engine control unit determines an engine rpm variation according to an output from said turbine sensor and a change gear input shaft rpm output determined based on a characteristic of the torque converter and generates a misfire judgment signal according to the determined engine rpm variation.

2. A combustion condition detection system according to claim 1, wherein the generated misfire judgment signal is used for processing the misfire.

3. An internal combustion engine misfire detection device for a motor vehicle in which an output of an internal combustion engine is transmitted via a torque converter to a drive shaft, comprising:

a primary misfire detecting unit which detects an internal combustion engine misfire condition, including a possible false indication of a misfire condition thereof;

an external cause detecting unit which detects an influence of an externally caused variation of the motor vehicle operating condition transmitted from the drive shaft via the torque converter; and a misfire judging unit which judges whether the internal combustion engine misfire condition detected by said primary misfire detecting means is a true misfire condition or a false misfire condition, based on an output from said external cause detecting unit;

wherein said output of said external cause detecting unit is an internal combustion engine load variation at every predetermined time calculated from signals representing the operating condition variation transmitted from the drive shaft via the torque converter; and wherein the internal combustion engine load variation is an estimated engine load variation determined by converting the influence of the external cause variation transmitted from the drive shaft to the torque converter into a change gear input shaft torque according to a torque converter characteristic, and further comprising a misfire judgment disabling unit which renders said misfire judging unit inoperative based on the estimated engine load variation.

4. An internal combustion engine misfire detection device for a motor vehicle in which an output of an internal combustion engine is transmitted via a torque converter to a drive shaft, comprising:

a primary misfire detecting unit which detects an internal combustion engine misfire condition, including a possible false indication of a misfire condition thereof;

an external cause detecting unit which detects an influence of an externally caused variation of the motor vehicle operating condition transmitted from the drive shaft via the torque converter; and a misfire judging unit which judges whether the internal combustion engine misfire condition detected by said primary misfire detecting means is a true misfire condition or a false misfire condition, based on an output from said external cause detecting unit;

wherein said output of said external cause detecting unit is an internal combustion engine load variation at every predetermined time calculated from signals representing the operating condition variation transmitted from the drive shaft via the torque converter; and wherein the internal combustion engine load variation is an estimated engine load variation determined by converting the influence of the external cause variation transmitted from the drive shaft to the torque converter into a change gear input shaft torque according to a torque converter characteristic, and further comprising a misfire processing unit which performs a predetermined processing for a misfire operating condition in response to the estimated engine load variation determined by said misfire judging unit.

5. An internal combustion engine misfire detection device for a motor vehicle in which an output of an internal combustion engine is transmitted via a torque converter to a drive shaft, comprising:

a primary misfire detecting unit which detects an internal combustion engine misfire condition, including a possible false indication of a misfire condition thereof;

an external cause detecting unit which detects an influence of an externally caused variation of the motor vehicle operating condition transmitted from the drive shaft via the torque converter; and a misfire judging unit which judges whether the internal combustion engine misfire condition detected by said primary misfire detecting means is a true misfire condition or a false misfire condition, based on an output from said external cause detecting unit;

wherein said output of said external cause detecting unit is an engine rpm variation estimated from an rpm variation of a torque converter output in a change gear, and further comprising a misfire judgment disabling unit which renders said misfire judging unit inoperative based on estimated engine rpm variation.

6. A method of determining an internal combustion engine misfire of a motor vehicle in which an output of an internal combustion engine is transmitted via a torque converter to a drive shaft comprising the steps of:

determining an rpm ratio from an engine rpm and a torque converter rpm;

calculating turbine torques based on the determined rpm ratio;

judging an engine rpm variation based on a variation of the calculated turbine torques; and disabling a misfire judgment or processing for a misfire operating condition based on judgment result of said engine rpm variations.

7. A method of determining an internal combustion engine misfire according to claim 6, wherein when an influence associated with an external cause variation to the internal combustion engine is provided from the drive shaft to the torque converter, engine rpm n1 is calculated according to the following equation:

$$n1 = n2(tx\ Cp/Cp')^{-1/2}$$

wherein n1 : input rpm (engine rpm)

n2 : output rpm (turbine rpm)

t : torque ratio T2/T1

T1 : input torque (engine torque)

T2 : output torque (turbine torque)

Cp : capacity coefficient $T1/n1^2$

Cp' : inverted capacity coefficient $T2/n2^2$.

* * * * *